Dec. 22, 1942.   W. MURRAY   2,306,275
SELF SEALING GAS TANK FOR AIRCRAFT
Filed Oct. 30, 1940
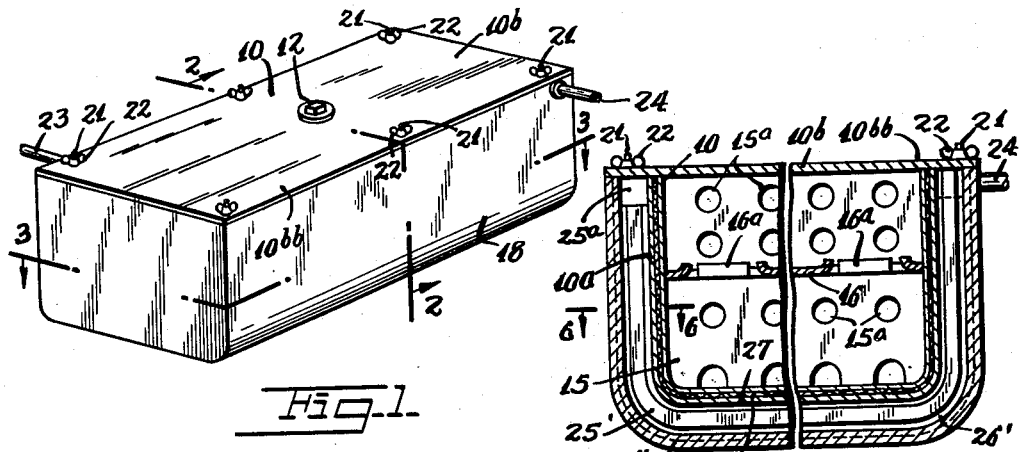
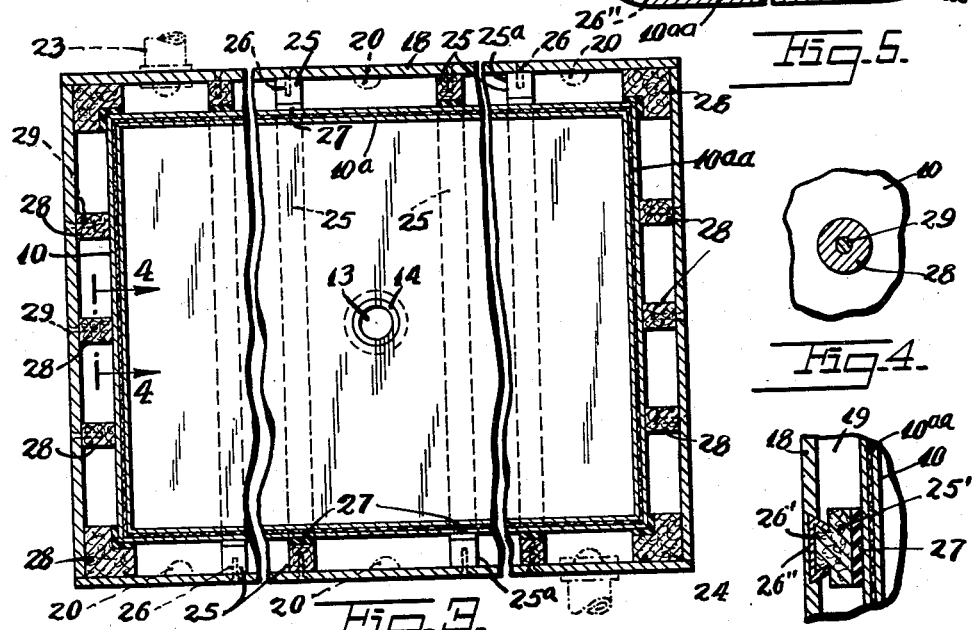
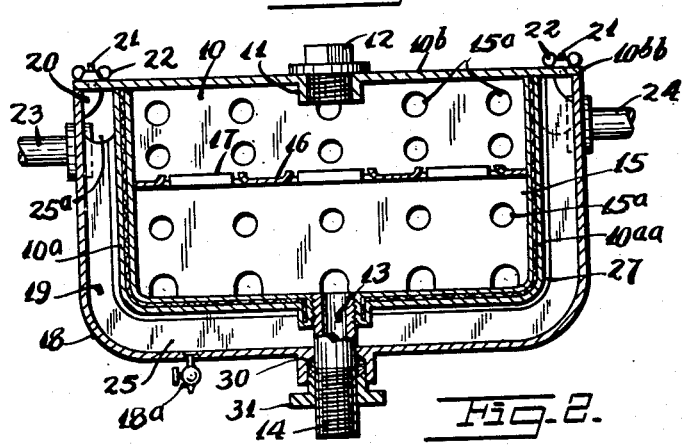
INVENTOR
William Murray
BY
ATTORNEY Patented Dec. 22, 1942

2,306,275

UNITED STATES PATENT OFFICE 2,306,275

SELF-SEALING GAS TANK FOR AIRCRAFT

William Murray, Astoria, Long Island, N. Y.

Application October 30, 1940, Serial No. 363,393

1 Claim. (Cl. 220—14)

This invention relates to new and useful improvements in a self sealing gas tank for aircraft and other purposes.

More specifically the invention proposes the construction of a self sealing gas tank characterized by an inner tank for holding gasoline or the like, and an outer tank encasing the sides and bottom of the inner tank in a manner to form an enclosed chamber about the inner tank for the purpose of catching and holding any fumes or gasoline leaking from said inner tank.

Still further the invention proposes the provision of pipe connections at the remote ends of the outer tank for supplying air to the chamber between the adjacent walls of said tanks in a manner to cause all of the fumes caught within said outer tank to be blown therefrom to prevent static electricity or other electrical charges common in aircraft from causing an explosion.

Still further it is proposed to provide a baffle system within the chamber between said inner and outer tanks in a manner to guide the flow of air through all sections of the chamber in a manner to free the same of the entrapped gas fumes.

Still further it is proposed to construct said inner tank of "Neoprene" and provide it with horizontally and vertically arranged baffles provided with openings therethrough for restricting a free flow of gasoline from one side to the other, while the plane is in the process of turning or negotiating a bank.

A still further object of this invention proposes to construct a baffle system of removably mounted spaced ribs arranged in a manner to be removed from said outer talk in a manner to permit the same to be interchanged when they become worn or for permitting the same to be interchanged with different sized ribs to adjust the interior of the outer tank to accommodate inner tanks of different sizes.

A further object of this invention is to construct a self sealing gas tank which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a perspective view of a self sealing gas tank constructed in accordance with this invention.

Fig. 2 is an enlarged vertical sectional view taken on the line 2—2 of Fig. 1.

Fig. 3 is an enlarged horizontal sectional view taken on the line 3—3 of Fig. 1.

Fig. 4 is an enlarged vertical sectional view taken on the line 4—4 of Fig. 3.

Fig. 5 is a vertical sectional view of a self sealing gas tank constructed in accordance with a modification of this invention.

Fig. 6 is a horizontal sectional view taken on the line 6—6 of Fig. 5.

The self sealing gas tank for aircraft and other purposes according to this invention includes an inner tank 10 of standard construction. This inner tank 10 is made of Neoprene and consists of a body portion 10$^a$ having a cover 10$^b$ with its side flanges 10$^{bb}$ projected beyond the sides of the body 10$^a$. The central area of the cover 10$^b$ is provided with an inlet opening 11 closed by means of a plug 12 permitting gasoline to be poured into the inner container 10. The bottom wall of the body 10$^a$ is provided with an outlet 13 which connects with a nipple 14 which in turn is adapted to be connected with a feed line leading to the motors of the airplane or other object to which the gas tank is applied.

The interior of the inner tank 10 is provided with a plurality of longitudinally spaced vertically arranged baffle plates 15 having openings 15$^a$ through which the gasoline is adapted to pass for reaching the outlet opening 13. The vertically spaced baffle plates 15 are held separated by means of a horizontal baffle plate 16 having a plurality of openings 17 for permitting the gasoline to pass from the top portion of the inner tank to the bottom thereof to discharge through the outlet opening 13. These baffle plates 15 and 16 act to prevent the gasoline contained within the tank 10 from shifting too quickly when the airplane negotiates a turn for preventing the same from being tilted or from becoming top-heavy.

The body portion 10$^a$ is preferably made with a wire mesh or screen 10$^{aa}$ embedded in the sheet of the body portion to reinforce the same.

An outer tank 18 encases the sides and bottom of the inner tank 10 for forming an enclosed chamber 19 about the sides and the bottom of the inner tank 10. Means is provided for securely attaching the top edges of the outer tank 18 in position upon the flanges 10$^{bb}$ of the cover 10$^b$. This means comprises a plurality of spaced bosses 20 formed on the inside top edge of the outer tank 18 and which are provided with upwardly extending screws 21 which pass through openings formed in the flange 10$^{bb}$. Thumb nuts 22 are threadedly engageable upon the screws 21 and are adapted to be used for clamping the cover 10$^b$ in position across the open top of the outer tank 18 for the purpose of sealing the chamber 19.

Pipe connections are provided at the remote ends of the outer tank 18 for blowing air through the chamber 19 for clearing out any gas fumes which might collect within the chamber 19 in the event the inner tank 10 leaks. These pipe connections are characterized by an air inlet pipe 23 mounted on one corner of the outer tank 18 and an air outlet tank 24 mounted on an opposite remote corner of the outer tank 18. Air is adapted to pass through the inlet pipe 23 completely through the interior of the chamber 19 and then through the air outlet pipe 24. The inlet pipe 23 and the outlet pipe 24 may be located at any desired position and extend from the outer tank 18. A suitable outlet 18ᵃ is provided in the bottom of the outer tank 18 to permit the escape of gases under excess pressure.

A baffle system is provided within the chamber 19 for guiding the flow of the air to all sections of the chamber when passing from the inlet pipe 23 to the outlet pipe 24. This baffle system is characterized by a plurality of longitudinally spaced ribs 25 mounted within the chamber 19 and which extend completely around the sides and bottom of the inner tank 10. The ribs 25 are provided with openings 25ᵃ at alternately arranged ends, and the ribs act to divide the chamber 19 into a plurality of sub-chambers, and the openings 25 permit the air to pass from one sub-chamber to the next and are arranged in such a manner that the air will continuously pass through the sub-chambers from the air inlet pipe 23 until it reaches the air outlet pipe 24. These ribs 25 are constructed of wood or other similar material and are securely attached to the inside face of the outer tank 18 by means of pins 26. The inner face of the ribs 25 which contact the outside faces of the inner tank 10 are provided with rubber sealing elements 27 for preventing the air from passing through the adjacent faces of the ribs 25 and the side walls of the inner tank.

The end walls of the outer tank 18 are provided with means for assisting the screws 21 in holding the inner tank against longitudinal movement with relation to the outer tank 18. This means comprises circular spacer members 28 securely mounted upon the end walls of the outer tank 18 by means of pins 29. The free ends of the spacer elements 28 bear against the end walls of the inner tank 10 as shown in Fig. 3 for holding the tanks against longitudinal movement with relation to each other. The nipple 14 which extends from the outlet 13 of the inner tank 10 passes through a complementary opening 30 formed in the bottom wall of the outer tank 18. This opening 30 is provided with a packing gland 31 for preventing the air from leaking from between the adjacent faces of the nipple 14 and the material of the tank 18 around the opening 30.

The operation of this form of the invention is as follows:

The tank 10 is positioned within the outer tank 18 and the nipple 14 is connected to the feed line for supplying gasoline to the motors of the object to which the tank has been applied, and the air inlet pipe 23 is connected with a compressor or other source of air supply, and the air outlet pipe 24 is arranged to discharge with the atmosphere. The cap 12 is removed and the interior of the inner tank 10 is filled with gasoline to the top. In the event the inner tank 10 should leak gasoline passing therethrough will be contained within the chamber 19 where the air passing therethrough will cause the same to be evaporated and blow the fumes through the discharge opening 24 in a manner to prevent static electricity or other electrical charges from igniting the leaking gasoline and so cause an explosion.

In the form of the invention shown in Figs. 5 and 6 a means is provided for removably mounting the ribs 25' of the baffle system contained within the chamber 19 for permitting the same to be removed to be interchanged with new ribs when the ribs become worn and no longer act to properly seal the sub-chambers of the chamber 19. In this form of the invention it is also possible to remove the ribs 25 and interchange the same with ribs of different sizes to accommodate the interior of the outer tank to inner tanks 10 of different sizes. In this form of the invention the ribs 25' are constructed of flexible material and are provided with dove-tail binding elements 26' which slidably engage with complementary dove-tail grooves 26", formed in the inside face of the outer tank 18. These grooves 26" extend from the top edge of the tank 18 downwards along the sides thereof along the bottom thereof and upwards along the opposite sides thereof to a position adjacent the top edge. This formation of the groove 26" prevents the rib 25' from being engaged too far into the tank 18 and so form openings 25ᵃ on opposite ends of the ribs. In other respects this form of the invention is similar to that previously described and like reference numerals are used to identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a device of the class described having an outer tank formed with an open top closed by a removable cover and enclosing the sides and bottom of an inner tank for liquid and with the side and bottom walls of said tanks being spaced, transversely extending longitudinally spaced tracks disposed in said space and mounted on the walls of one of said tanks and continuously extended along the sides and bottom of the tank on which they are mounted with their ends disposed adjacent the top of said tanks, and continuous flexible ribs slidably mounted on said tracks and having their free faces abutting the sides and bottom walls of the other of said tanks so that said ribs may be slid from the ends of said tracks through the open top of said outer tank when said cover is removed, said ribs being of equal lengths with alternate ribs having their free ends positioned adjacent said cover, the other of said ends of each of said ribs being spaced from said cover thereby forming by-passes to continuously connect the spaces between adjacent ribs, and venting means being positioned at opposite ends and alternate corners of said tank for exhausting fumes which may be collected in said spaces.

WILLIAM MURRAY.